Jan. 22, 1952   A. P. SCHNEIDER   2,583,307
HYDRAULIC CONTROL SYSTEM
Filed June 17, 1950
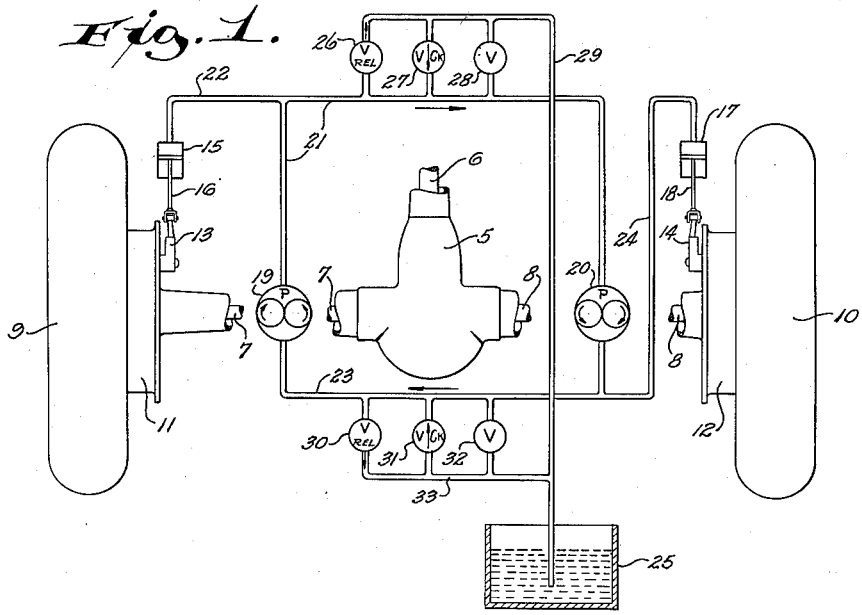
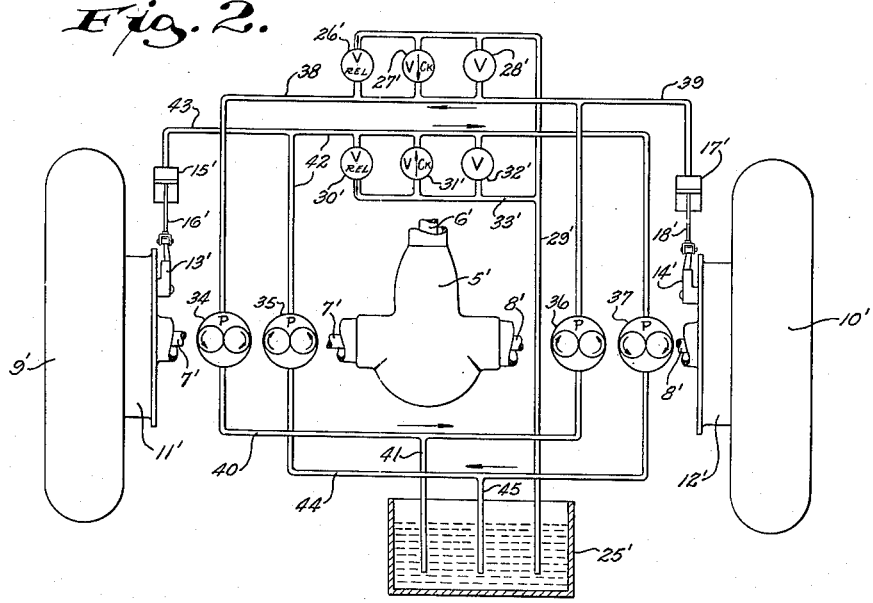
INVENTOR.
Albert P. Schneider
BY
Morsell & Morsell
ATTORNEYS.

Patented Jan. 22, 1952

2,583,307

UNITED STATES PATENT OFFICE 2,583,307

HYDRAULIC CONTROL SYSTEM

Albert P. Schneider, Milwaukee, Wis.

Application June 17, 1950, Serial No. 168,695

20 Claims. (Cl. 74—711)

1

This invention relates to improvements in hydraulic control systems, and more particularly to hydraulic systems for synchronizing the speeds of a pair of shafts.

There are many applications wherein it is desirable to be able to synchronize the speeds of a pair of shafts. One such application of particular value is the synchronization of a pair of differentially connected shafts such as those found in the rear axle of an automobile or truck.

During certain seasons of the year and in certain areas it is not uncommon for one rear wheel of a car or truck to become stuck in soft and/or slippery material such as mud, sand, snow, or ice. Even though the other rear wheel may be on a solid footing, the vehicle cannot free itself because all of the engine torque is transmitted through the differential to the wheel on the slippery footing. This causes the latter wheel to spin and to dig in to such a degree that the vehicle cannot extract itself.

It is, therefore, a general object of the present invention to provide an hydraulic control system for synchronizing the speeds of a pair of differentially connected shafts.

A further object of the invention is to provide an hydraulic control system of the class described which, when applied to the differentially connected axles of an automobile or truck, prevents spinning of either of the driving wheels of the vehicle relative to the other driving wheel, thereby insuring the transmission of engine torque to both of said wheels and permitting a vehicle so equipped to extract itself from many positions wherein it would otherwise be stalled as a result of having one wheel on slippery footing.

A further object of the invention is to provide an hydraulic control system of the class described which automatically applies a brake to either drive wheel of a vehicle which tends to spin relative to the other drive wheel.

A further object of the invention is to provide an hydraulic control system of the class described including a pair of substantially identical positive displacement pumps, each driven by one of two differentially connected shafts, said pumps being hydraulically connected in series in a closed circuit, and said system including at least one power piston connected into said closed circuit between said pumps, said power piston being responsive to variations in pressure in said circuit resulting from variations in the speed of one of said shafts relative to that of the other.

2

A further object of the invention is to provide an hydraulic control system of the class described having means for permitting a predetermined amount of variation in the speeds of the shafts beyond which the power piston is actuated.

A further object of the invention is to provide an improved hydraulic control system having means accessible from the operator's position for selectively rendering said system operative or inoperative.

A further object of the invention is to provide an improved hydraulic control system which is simple in construction and which is readily adaptable to present day automobile and truck construction.

A further object of the invention is to provide an improved hydraulic control system which is positive in operation, relatively simple to manufacture, and which is otherwise well adapted for the purposes described.

With the above and other objects in view, the invention consists of the improved hydraulic control system and all of its parts and combinations as set forth in the claims, and all equivalents thereof.

In the drawing accompanying and forming a part of this specification, wherein are shown two forms of the invention and wherein like characters of reference indicate the same parts in both of the views:

Fig. 1 is a semi-diagrammatic view of the preferred form of the invention applied to the driving mechanism of a motor vehicle; and Fig. 2 is a view similar to Fig. 1 showing a modified form of the invention applied to the driving mechanism of a motor vehicle.

Referring more particularly to Fig. 1 of the drawing, the numeral 5 indicates the differential of a motor vehicle. A drive shaft 6 projects forwardly from the differential 5 and is driven by a source of power (not shown), such as an internal combustion engine. Projecting in opposite lateral directions from the differential 5 are a pair of rear axles 7 and 8 which are respectively fixed to the left and right driving wheels 9 and 10. The wheels 9 and 10 are respectively provided with suitable brake mechanisms 11 and 12 which are equipped with brake actuating levers 13 and 14. A suitably mounted hydraulic ram or power piston 15 is provided with a piston rod 16 which is preferably pivotally connected to the outer end of the brake lever 13. The brake 11, lever 13 and the ram 15 are preferably arranged so that extensible movement of the rod 16 causes application of braking action to the wheel 9 by the brake 11. An hydraulic ram or power piston 17 is provided with a piston rod 18, the outer end of which is preferably pivotally connected to the outer end of the brake lever 14. The brake mechanism 12, the lever 14 and rod 18 are preferably arranged so that extensible movement of the rod 18 causes braking action to be applied to the wheel 10 by the brake 12.

The numeral 19 indicates a positive displacement pump, preferably of the gear type, which is driven by the axle 7. The numeral 20 indicates a positive displacement pump which is preferably identical to the pump 19 and which is driven by the axle 8. A conduit 21 connects the outlet of the pump 19 to the inlet of the pump 20 and also has an extension 22 which communicates with the power piston 15, as shown. A conduit 23 connects the outlet of the pump 20 to the inlet of the pump 19 and also has an extension 24 which communicates with the power piston 17. It is apparent that the conduits 21 and 23 connect the pumps 19 and 20 in a closed series circuit.

The numeral 25 indicates a reservoir or other source of hydraulic fluid. A normally closed pressure relief valve 26, a normally closed inlet check valve 27 and a normally open bleeder valve 28 each communicate with the conduit 21, as shown in Fig. 1. A conduit 29 communicates at one end with the valves 26, 27 and 28, and terminates at its opposite end preferably below the liquid level of the reservoir 25. A normally closed pressure relief valve 30, a normally closed inlet check valve 31 and a normally open bleeder valve 32 communicate with the conduit 23, as shown. A conduit 33 communicates between the valves 30, 31 and 32 and the conduit 29, thereby affording communication between said valves and the reservoir 25.

The pressure relief valves 26 and 30 are preferably of the type which can be manually turned to open position, and said valves are preferably located in a position readily accessible from the driver's seat of the vehicle. The check valves 27 and 31 may also be of the type which can be manually opened. The bleeder valves 28 and 32 are of relatively small capacity and are manually adjustable to vary the size of the opening thereof for a purpose to be hereinafter described.

During normal operation of a vehicle provided with the preferred form of hydraulic control system shown in Fig. 1, the drive shaft 6 transmits rotative power to the axles 7 and 8 and the wheels 9 and 10. The torque from the shaft 6 is normally equally divided between the shafts 7 and 8, and the speed of said shafts is therefore normally equal when the vehicle is travelling in a straight line direction. During such operation, the pumps 19 and 20 are each pumping an identical quantity of fluid. The output of one pump is received by the second pump and is returned to the inlet of the first mentioned pump. There is normally no substantial pressure in any of the conduits 21, 22, 23 or 24.

When the vehicle rounds a curve or makes a turn, one of the wheels, for example, the wheel 10, must travel at greater speed than the other while said curve or turn is being negotiated. The slightly greater speed of the wheel 10 in this event causes a like increase in the speed of the pump 20, thereby slightly increasing the amount of fluid pumped into the conduit 23 by the pump 20 and also slightly increasing the amount of fluid drawn from the conduit 21 by the pump 20. The slight excess of fluid from the pump 20 in the conduit 23 flows out through the bleeder valve 32 and into the conduits 33 and 29, whereas the additional amount of fluid required by the pump 20 from the conduit 21 is drawn in through the bleeder valve 28 from the conduit 29. It is apparent, therefore, that a pre-determined, preferably slight, differential in the speeds of the wheels 9 and 10 is compensated for by the bleeder valves 28 and 32, and no appreciable pressure differential occurs between the conduits 21 and 23 while the slight speed differential obtains. The amount of speed differential which can be compensated for by the bleeder valves 28 and 32 can be varied by adjusting the openings in the valves 28 and 32.

The improved control system is of particular value when one of the drive wheels of a vehicle becomes positioned on soft or slippery footing, such as mud, snow or sand, while the other drive wheel remains on a solid footing affording good traction. In such a case, the wheel on the slippery footing will spin, while the opposite wheel on the solid footing remains stationary. Substantially all of the torque from the drive shaft 6 in this event is directed to the spinning wheel, and without the improved control system, the spinning wheel would dig itself in to such an extent that the vehicle would be unable to extract itself.

With the improved hydraulic control system, spinning of one of the wheels, for example the wheel 10, and stoppage of the other wheel 9 greatly increases the speed of the pump 20 and stops the pump 19. The pump 20, therefore, greatly increases the pressure in the conduits 23 and 24, and this pressure causes extensible movement of the piston rod of the ram 17, which in turn sets the brake 12 to slow down the wheel 10 and the shaft 8, as well as the pump 20. As the brake 12 is applied to the wheel 10, the differential 5 diverts torque from the shaft 6 to the shaft 7 and the wheel 9. This, of course, causes rotation of the wheel 9 and of the pump 19, and because said wheel is on a firm footing, its tractive effort will be exerted in moving the vehicle forwardly. Thus, with the improved control system, a vehicle is enabled to extract itself from many positions wherein it would otherwise be stalled due to the spinning of one of its driving wheels.

During spinning of the wheel 10, any excessive pressures in the conduits 23 and 24 are relieved by the pressure relief valve 30 which permits excess fluid to flow into the conduits 33 and 29 and thence into the reservoir 25. Also during the spinning of the wheel 10, fluid for the pump 20 is drawn into the conduit 21 through the inlet check valve 27 from the conduit 29 and the reservoir 25.

As the speeds of the wheels 9 and 10 become equalized, either through application of the brake 12 or due to the extraction of the vehicle from the mired position, the normal condition of substantially no pressure again exists in the conduits 21 and 23. The piston rod 18 of the hydraulic ram 17 is thereby automatically retracted to release the brake 12.

The operation of the improved control system, when the wheel 9 is positioned on a soft or slippery footing and the wheel 10 is on a firm footing, is similar to that just described. When the wheel 9 spins, the pump 19 speeds up therewith and the pump 20 stops along with the wheel 10. The pump 19 then draws fluid into the conduit 23 through the check valve 31 and raises the pressure in the conduits 21 and 22. The increased pressure actuates the ram 15 and causes extensible movement of the piston rod thereof which in turn sets the brake 11. Fluid pumped by the pump 19 flows out through the pressure relief valve 26 and into the conduit 29 and the reservoir 25. As the spinning wheel 9 is slowed by the brake 11, the differential 5 diverts torque from the drive shaft 6 to the wheel 10, thereby permitting said wheel to urge the car forwardly along the firm road bed.

The operation of the improved control system is such that initially the brake of a spinning wheel may stop said wheel, momentarily throwing all of the torque from the shaft 6 to the wheel on the firm footing. However, eventually the system attains a state of equilibrium between both wheels, wherein said wheels travel at the same speed regardless of whether or not one of the wheels continues to slip in the soft footing. The improved system, therefore, provides an efficient means for synchronizing the speed of a pair of differentially connected shafts, such as vehicle axles.

The apparatus of the form of the invention shown in Fig. 2 performs substantially the same functions as that of the preferred form of the invention. In Fig. 2 primed numerals indicate parts which are substantially identical to the parts indicated by the same numbers unprimed in Fig. 1. In Fig. 2 a pair of positive displacement pumps 34 and 35 are driven by the axle 7'. A pair of positive displacement pumps 36 and 37 which are preferably respectively identical to the pumps 34 and 35, are driven by the axle 8'. A conduit 38 connects the inlet of the pump 34 to the outlet of the pump 36 and has an extension 39 which communicates with the ram or power piston 17'. A conduit 40 connects the outlet of the pump 34 to the inlet of the pump 36 and also has an extension 41 which preferably communicates with the reservoir 25' below the liquid level thereof, as shown.

A conduit 42 connects the outlet of the pump 35 with the inlet of the pump 37 and also has an extension 43 which communicates with the ram or power piston 15'. A conduit 44 connects the outlet of the pump 37 with the inlet of the pump 35 and also has an extension 45 which preferably communicates with the reservoir 25 below the liquid level thereof. The pressure relief valve 26', the inlet check valve 27', and the bleeder valve 28' communicate with the conduits 38 and 29', as shown, the latter conduit communicating with the reservoir 25' preferably below the liquid level thereof. The pressure relief valve 30', the inlet check valve 31', and the bleeder valve 32' communicate with the conduits 42 and 33' as shown, the latter conduit also communicating with the conduit 29'.

During normal straight line operation of the vehicle, all of the pumps are operating at substantially the same speed, and there is substantially no pressure in the conduits 38, 40, 42 and 44. If, however, the wheel 9' should spin relative to the wheel 10', substantial pressures would be built up in the conduit 42 and said pressures would actuate the ram 15' to set the brake 11'. The fluid for the pump 35 would in this case be drawn in through the conduit 45 and would be discharged through the pressure relief valve 30' back to the reservoir 25' through the conduits 33' and 29'. As the wheel 9' is spinning, the pump 34 draws fluid from the reservoir 25' through the conduit 29', the inlet check valve 27' and the conduit 38. The fluid discharged from the pump 34 flows back to the reservoir 25' through the conduits 40 and 41. As in the preferred form of the invention, when the speed of the wheel 9' is retarded, the differential 5' diverts torque to the wheel 10', which, in turn, permits said wheel to urge the vehicle forwardly.

When the wheel 10' spins relative to the wheel 9', the pumps 36 and 37 spin with the wheel 10' and substantial pressures are built up in the conduits 38 and 39. These pressures actuate the ram or power piston 17' and set the brake 12'. Fluid for the pump 36, in such a case, is drawn from the reservoir 25' through the conduits 41 and 40, and said fluid is discharged from the conduit 38 through the pressure relief valve 26', being returned to the reservoir 25' through the conduit 29'. As the pump 37 rotates with the wheel 10' it draws fluid from the reservoir 25' through the conduits 29' and 33', the inlet check valve 31' and the conduit 42. The fluid pumped by the pump 37 is returned to the reservoir 25' through the conduits 44 and 45.

The bleeder valves 28' and 32' serve substantially the same function as the valves 28 and 32 of the preferred form. The valves 28' and 32' permit a predetermined relatively small increase in the amount of fluid pumped by the pumps 36 or 35, relative to the amount pumped respectively by the pumps 34 or 37. As in the preferred form, the bleeder valves permit a predetermined amount of relative rotation of the vehicle wheels before either of the power pistons is actuated.

In both forms of the invention it is intended that either the pressure relief valves or the inlet check valves or both, should be positioned within easy reach of the driver's position so that said valves can be manually opened to render the system inoperative at will. The connection between the power pistons and the brakes are merely illustrative, and any other suitable connection means may be used.

Various other changes and modifications may be made without departing from the spirit of the invention, and all of such changes are contemplated as may come within the scope of the claims.

What I claim is:

1. In an hydraulic system for controlling the speed of a pair of shafts: first and second positive displacement pumps driven by one of said shafts; third and fourth positive displacement pumps driven by the other of said shafts; an hydraulic fluid source; a first conduit connecting the outlet of said first pump to the inlet of said third pump, said conduit also communicating with said fluid source; a second conduit connecting the outlet of said fourth pump to the inlet of said second pump, said conduit also communicating with the fluid source; a first power piston; a third conduit connecting the outlet of the second pump to the inlet of the fourth pump, said conduit also communicating with said first power piston; a second power piston; and a fourth conduit connecting the outlet of the third pump to the inlet of the first pump, said conduit also communicating with the second power piston.

2. In an hydraulic system for controlling the speed of a pair of shafts: first and second positive displacement pumps driven by one of said shafts; third and fourth positive displacement pumps driven by the other of said shafts; an hydraulic fluid source; a first conduit connecting the outlet of said first pump to the inlet of said third pump, said conduit also communicating with said fluid source; a second conduit connecting the outlet of said fourth pump to the inlet of said second pump, said conduit also communicating with the fluid source; a first power piston; a third conduit connecting the outlet of the second pump to the inlet of the fourth pump, said conduit also communicating with said first power piston; a second power piston; a fourth conduit connecting the outlet of the third pump to the inlet of the first pump, said conduit also communicating with the second power piston; a first normally open bleeder valve of restricted capacity communicating between said third conduit and said fluid source; and a second normally open bleeder valve of restricted capacity communicating between said fourth conduit and said fluid source, said bleeder valves permitting a predetermined differential in speeds of the shafts being controlled before actuation of the power pistons.

3. In an hydraulic system for controlling the speed of a pair of shafts: first and second positive displacement pumps driven by one of said shafts; third and fourth positive displacement pumps driven by the other of said shafts; an hydraulic fluid source; a first conduit connecting the outlet of said first pump to the inlet of said third pump, said conduit also communicating with said fluid source; a second conduit connecting the outlet of said fourth pump to the inlet of said second pump, said conduit also communicating with the fluid source; a first power piston; a third conduit connecting the outlet of the second pump to the inlet of the fourth pump, said conduit also communicating with said first power piston; a second power piston; a fourth conduit connecting the outlet of the third pump to the inlet of the first pump, said conduit also communicating with the second power piston; a pressure relief valve communicating with said third conduit; a pressure relief valve communicating with said fourth conduit; a first normally open bleeder valve of restricted capacity communicating between said third conduit and said fluid sources; and a second normally open bleeder valve of restricted capacity communicating between said fourth conduit and said fluid source, said bleeder valves permitting a predetermined differential in speeds of the shafts being controlled before actuation of the power pistons.

4. In a vehicle, the combination of: a differential; a pair of axles driven by said differential; a brake for the first of said axles; a power piston for actuating said brake; a first positive displacement pump driven by the first of said axles; a second positive displacement pump driven by the second of said axles; a first conduit connecting the outlet of the first pump to the inlet of the second pump, said conduit also communicating with the power piston; and a second conduit connecting the outlet of the second pump with the inlet of the first pump.

5. In a vehicle, the combination of: a differential; a pair of axles driven by said differential; a brake for the first of said axles; a power piston for actuating said brake; a first positive displacement pump driven by the first of said axles; a second positive displacement pump driven by the second of said axles; a first conduit connecting the outlet of the first pump to the inlet of the second pump, said conduit also communicating with the power piston; a second conduit connecting the outlet of the second pump with the inlet of the first pump; an hydraulic fluid source; and a normally open bleeder valve of restricted capacity communicating between said first conduit and said fluid source, said bleeder valve permitting a predetermined differential in speeds of the axles before actuation of said power piston.

6. In a vehicle, the combination of: a differential; a pair of axles driven by said differential; a brake for each of said axles; a first positive displacement pump driven by the first of said axles; a second positive displacement pump driven by the second of said axles; a first power piston for actuating the brake of the first axle; a second power piston for actuating the brake of the second axle; a first conduit connecting the outlet of the first pump to the inlet of the second pump, said conduit also communicating with the first power piston; and a second conduit connecting the outlet of the second pump with the inlet of the first pump, said second conduit also communicating with the second power piston.

7. In a vehicle, the combination of: a differential; a pair of axles driven by said differential; a brake for each of said axles; a first positive displacement pump driven by the first of said axles; a second positive displacement pump driven by the second of said axles; a first power piston for actuating the brake of the first axle; a second power piston for actuating the brake of the second axle; a first conduit connecting the outlet of the first pump to the inlet of the second pump, said conduit also communicating with the first power piston; a second conduit connecting the outlet of the second pump with the inlet of the first pump, said second conduit also communicating with the second power piston; an hydraulic fluid source; a first normally open bleeder valve of restricted capacity communicating between said first conduit and the fluid source; and a second normally open bleeder valve of restricted capacity communicating between said second conduit and the fluid source, said bleeder valves permitting a predetermined differential in speed of the axles before actuation of either of the power pistons.

8. In a vehicle, the combination of: a differential; a pair of axles driven by said differential; a brake for each of said axles; a first positive displacement pump driven by the first of said axles; a second positive displacement pump driven by the second of said axles; a first power piston for actuating the brake of the first axle; a second power piston for actuating the brake of the second axle; a first conduit connecting the outlet of the first pump to the inlet of the second pump, said conduit also communicating with the first power piston; a second conduit connecting the outlet of the second pump with the inlet of the first pump, said second conduit also communicating with the second power piston; an hydraulic fluid source; an inlet check valve for said first conduit communicating with the fluid source; and an inlet check valve for said second conduit communicating with the fluid source.

9. In a vehicle, the combination of: a differential; a pair of axles driven by said differential; a first positive displacement pump driven by the first of said axles; a second positive displacement pump driven by the second of said axles; a first power piston for actuating the brake of the first axle; a second power piston for actuating the brake of the second axle; a first conduit connecting the outlet of the first pump to the inlet of the second pump, said conduit also communicating with the first power piston; a second conduit connecting the outlet of the second pump with the inlet of the first pump, said second conduit also communicating with the second power piston; an hydraulic fluid source; a pressure relief valve communicating with said first conduit; a pressure relief valve communicating with said second conduit; a first normally open bleeder valve of restricted capacity communicating between said first conduit and the fluid source; and a second normally open bleeder valve of restricted capacity communicating between said second conduit and the fluid source, said bleeder valves permitting a predetermined differential in speed of the axles before actuation of either of the power pistons.

10. In a vehicle, the combination of: a differential; a pair of axles driven by said differential, a brake for each of said axles; a first positive displacement pump driven by the first of said axles; a second positive displacement pump driven by the second of said axles; a first power piston for actuating the brake of the first axle; a second power piston for actuating the brake of the second axle; a first conduit connecting the outlet of the first pump to the inlet of the second pump, said conduit also communicating with the first power piston; a second conduit connecting the outlet of the second pump with the inlet of the first pump, said second conduit also communicating with the second power piston; an hydraulic fluid source; a pressure relief valve communicating with said first conduit, a pressure relief valve communicating with the second conduit; a first normally open bleeder valve of restricted capacity and a first inlet check valve each communicating between said first conduit and the fluid source; and a second normally open bleeder valve of restricted capacity and a second inlet check valve each communicating between said second conduit and the fluid source, said bleeder valves permitting a predetermined differential in speed of the axles before actuation of either of the power pistons.

11. In a vehicle, the combination of: a differential; a pair of axles driven by said differential; a brake for each of said axles; a first power piston for actuating the brake of said first axle; a second power piston for actuating the brake of the second axle; first and second positive displacement pumps driven by the first of said axles; third and fourth positive displacement pumps driven by the second of said axles; an hydraulic fluid source; a first conduit connecting the outlet of said first pump to the inlet of said third pump, said conduit also communicating with said fluid source; a second conduit connecting the outlet of said fourth pump to the inlet of said second pump, said conduit also communicating with the fluid source; a third conduit connecting the outlet of the second pump to the inlet of the fourth pump, said conduit also communicating with said first power piston; and a fourth conduit connecting the outlet of the third pump to the inlet of the first pump, said conduit also communicating with the second power piston.

12. In a vehicle, the combination of: a differential; a pair of axles driven by said differential; a brake for each of said axles; a first power piston for actuating the brake of said first axle; a second power piston for actuating the brake of the second axle; first and second positive displacement pumps driven by the first of said axles; third and fourth positive displacement pumps driven by the second of said axles; an hydraulic fluid source; a first conduit connecting the outlet of said first pump to the inlet of said third pump, said conduit also communicating with said fluid source; a second conduit connecting the outlet of said fourth pump to the inlet of said second pump, said conduit also communicating with the fluid source; a third conduit connecting the outlet of the second pump to the inlet of the fourth pump, said conduit also communicating with said first power piston; and a fourth conduit connecting the outlet of the third pump to the inlet of the first pump, said conduit also communicating with the second power piston; a first normally open bleeder valve of restricted capacity communicating between said third conduit and said fluid source; and a second normally open bleeder valve of restricted capacity communicating between said fourth conduit and said fluid source, said bleeder valves permitting a predetermined differential in speeds of the axles before actuation of the power pistons.

13. In a vehicle, the combination of: a differential; a pair of axles driven by said differential; a brake for each of said axles; a first power piston for actuating the brake of said first axle; a second power piston for actuating the brake of the second axle; first and second positive displacement pumps driven by the first of said axles; third and fourth positive displacement pumps driven by the second of said axles; an hydraulic fluid source; a first conduit connecting the outlet of said first pump to the inlet of said third pump, said conduit also communicating with said fluid source; a second conduit connecting the outlet of said fourth pump to the inlet of said second pump, said conduit also communicating with the fluid source; a third conduit connecting the outlet of the second pump to the inlet of the fourth pump, said conduit also communicating with said first power piston; and a fourth conduit connecting the outlet of the third pump to the inlet of the first pump, said conduit also communicating with the second power piston; a pressure relief valve communicating with said third conduit; a pressure relief valve communicating with said fourth conduit; a first normally open bleeder valve of restricted capacity communicating between said third conduit and said fluid source; and a second normally open bleeder valve of restricted capacity communicating between said fourth conduit and said fluid source, said bleeder valves permitting a predetermined differential in speeds of the axles before actuation of the power pistons.

14. In an hydraulic system for controlling the speed of a pair of shafts: a first and a second positive displacement pump driven by one of said shafts; a third and a fourth positive displacement pump driven by the other of said shafts; a first conduit connecting the outlet of said first pump to the inlet of the third pump; a second conduit connecting the outlet of the fourth pump to the inlet of the second pump; a third conduit connecting the outlet of the second pump to the inlet of the fourth pump; a fourth conduit connecting the outlet of the third pump to the inlet of the first pump; a first power piston connected to one of said second and third conduits; and a second power piston connected to one of said first and fourth conduits.

15. In combination: a pair of shafts; a brake for the first of said shafts; a power piston for actuating said brake; a first positive displacement pump driven by the first of said shafts; a second positive displacement pump driven by the second of said shafts; a first conduit connecting the outlet of the first pump to the inlet of the second pump; and a second conduit connecting the outlet of the second pump with the inlet of the first pump, one of said conduits communicating with said power piston.

16. In combination: a source of power; a pair of shafts driven by said source of power; a brake for the first of said shafts; a power piston for actuating said brake; a first positive displacement pump driven by the first of said shafts; a second positive displacement pump driven by the second of said shafts; a first conduit connecting the outlet of the first pump to the inlet of the second pump; and a second conduit connecting the outlet of the second pump with the inlet of the first pump, one of said conduits communicating with said power piston.

17. In a vehicle, the combination of: a differential; a pair of axles driven by said differential; a brake for the first of said axles; a power piston for actuating said brake; a first positive displacement pump driven by the first of said axles; a second positive displacement pump driven by the second of said axles; a first conduit connecting the outlet of the first pump to the inlet of the second pump; a second conduit connecting the outlet of the second pump with the inlet of the first pump, one of said conduits being connected to said power piston; and a normally open bleeder valve of restricted capacity communicating with the conduit connected to the power piston; said bleeder valve permitting a predetermined differential in speeds of the axles before actuation of said power piston.

18. In combination: a pair of shafts; a brake for each of said shafts; a first positive displacement pump driven by the first of said shafts; a second positive displacement pump driven by the second of said shafts; a first conduit connecting the outlet of the first pump to the inlet of the second pump; and a second conduit connecting the outlet of the second pump with the inlet of the first pump; a first power piston for actuating the brake of the first shaft, said piston being connected to one of said conduits; and a second power piston for actuating the brake of the second shaft, said piston being connected to the other of said conduits.

19. In combination: a source of power; a pair of shafts driven by said source of power; a brake for each of said shafts; a first positive displacement pump driven by the first of said shafts; a second positive displacement pump driven by the second of said shafts; a first conduit connecting the outlet of the first pump to the inlet of the second pump; and a second conduit connecting the outlet of the second pump with the inlet of the first pump; a first power piston for actuating the brake of the first shaft, said piston being connected to one of said conduits; and a second power piston for actuating the brake of the second shaft, said piston being connected to the other of said conduits.

20. In a vehicle, the combination of: a differential; a pair of axles driven by said differential; a brake for each of said axles; a first and a second positive displacement pump driven by the first of said axles; a third and a fourth positive displacement pump driven by the second of said axles; a first conduit connecting the outlet of the first pump to the inlet of the third pump; a second conduit connecting the outlet of the fourth pump to the inlet of the second pump; a third conduit connecting the outlet of the second pump to the inlet of the fourth pump, and a fourth conduit connecting the outlet of the third pump to the inlet of the first pump; a first power piston for actuating the brake of the first axle connected to one of said second and third conduits; and a second power piston for actuating the brake of the second axle connected to one of said first and fourth conduits.

ALBERT P. SCHNEIDER.

REFERENCES CITED

The following references are of record in the file of this patent:

UNITED STATES PATENTS

| Number | Name | Date |
| --- | --- | --- |
| 1,207,801 | Schmidt | Dec. 12, 1916 |
| 1,725,489 | Stratton | Aug. 20, 1929 |
| 2,250,695 | Algarsson | July 29, 1941 |
| 2,254,970 | MacNeil | Sept. 2, 1941 |
| 2,280,203 | Toulmin | Apr. 21, 1942 |
| 2,336,911 | Zimmermann | Dec. 14, 1943 |
| 2,393,557 | Orshansky | Jan. 22, 1946 |
| 2,401,628 | Eksergian | June 4, 1946 |
| 2,446,242 | Orshansky | Aug. 3, 1948 |